United States Patent
Shim et al.

(10) Patent No.: US 10,144,831 B2
(45) Date of Patent: Dec. 4, 2018

(54) OPTICAL FILM COMPRISING PRIMER LAYER CONTAINING POLYESTER RESIN AND POLARIZING PLATE USING SAME

(71) Applicant: LG CHEM, LTD., Seoul (KR)

(72) Inventors: Hwa-Sub Shim, Daejeon (KR); Jun-Wuk Park, Daejeon (KR); Yi-Rang Lim, Daejeon (KR); Kyoung-Won Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 284 days.

(21) Appl. No.: 15/025,454

(22) PCT Filed: Sep. 30, 2014

(86) PCT No.: PCT/KR2014/009168
§ 371 (c)(1),
(2) Date: Mar. 28, 2016

(87) PCT Pub. No.: WO2015/047012
PCT Pub. Date: Apr. 2, 2015

(65) Prior Publication Data
US 2016/0237284 A1   Aug. 18, 2016

(30) Foreign Application Priority Data

Sep. 30, 2013 (KR) .................. 10-2013-0117049
Sep. 26, 2014 (KR) .................. 10-2014-0129389

(51) Int. Cl.
| | | |
|---|---|---|
| C09D 5/00 | (2006.01) | |
| G02B 1/14 | (2015.01) | |
| B32B 7/02 | (2006.01) | |
| B32B 27/08 | (2006.01) | |
| B32B 27/16 | (2006.01) | |
| B32B 27/18 | (2006.01) | |
| B32B 27/30 | (2006.01) | |
| B32B 27/36 | (2006.01) | |
| C08J 7/04 | (2006.01) | |
| C09D 151/06 | (2006.01) | |
| C09D 167/02 | (2006.01) | |
| G02B 1/11 | (2015.01) | |
| G02B 5/30 | (2006.01) | |
| C09D 151/08 | (2006.01) | |
| G02B 1/111 | (2015.01) | |

(52) U.S. Cl.
CPC .............. *C09D 5/002* (2013.01); *B32B 7/02* (2013.01); *B32B 27/08* (2013.01); *B32B 27/16* (2013.01); *B32B 27/18* (2013.01); *B32B 27/308* (2013.01); *B32B 27/36* (2013.01); *C08J 7/042* (2013.01); *C08J 7/045* (2013.01); *C08J 7/047* (2013.01); *C09D 151/08* (2013.01); *C09D 167/02* (2013.01); *G02B 1/11* (2013.01); *G02B 1/111* (2013.01); *G02B 1/14* (2015.01); *G02B 5/3016* (2013.01); *G02B 5/3025* (2013.01); *B32B 2255/10* (2013.01); *B32B 2255/26* (2013.01); *B32B 2264/00* (2013.01); *B32B 2264/12* (2013.01); *B32B 2307/418* (2013.01); *B32B 2307/42* (2013.01); *B32B 2307/516* (2013.01); *B32B 2307/732* (2013.01); *B32B 2551/00* (2013.01); *C08J 2333/00* (2013.01); *C08J 2333/02* (2013.01); *C08J 2451/08* (2013.01); *C08J 2467/02* (2013.01)

(58) Field of Classification Search
CPC ........ C09D 5/002; C09D 5/08; C09D 151/08; C09D 167/02; G02B 1/10; G02B 1/105; G02B 1/11; G02B 1/111; G02B 1/14; B32B 7/02; B32B 27/08; B32B 27/308; B32B 27/36; B32B 27/06; B32B 2307/418; B32B 2307/42; B32B 2551/00; C08J 7/04; C08J 7/042; C08J 7/045; C08J 7/047; C08J 2333/00; C08J 2333/02; C08J 2451/08; C08J 2467/02
See application file for complete search history.

(56) References Cited

U.S. PATENT DOCUMENTS

| | | | |
|---|---|---|---|
| 5,258,444 A * | 11/1993 | Zezinka | ............... C08J 7/047 524/501 |
| 7,521,126 B2 | 4/2009 | Taki et al. | |
| 2002/0061394 A1 | 5/2002 | Fujita | |
| 2007/0009676 A1 | 1/2007 | Tamagawa et al. | |
| 2010/0002171 A1* | 1/2010 | Yoshimi | ............... G02B 5/3016 349/96 |

(Continued)

FOREIGN PATENT DOCUMENTS

| | | |
|---|---|---|
| CN | 1839176 A | 9/2006 |
| CN | 101200574 A | 6/2008 |

(Continued)

*Primary Examiner* — Stephone B Allen
*Assistant Examiner* — Adam W Booher
(74) *Attorney, Agent, or Firm* — Dentons US LLP

(57) ABSTRACT

The present invention relates to an optical film including: a base material film; and a primer layer containing a polyester resin and water-dispersible minute particulates on at least one surface of the base material film and having a refractive index difference of 0.03 or less from the base material film, in which the polyester resin includes polyester glycol formed by a reaction of polybasic acid including an aromatic carboxylic acid compound and an aliphatic carboxylic acid compound at a mole ratio of 1:9 to 9:1 and polyol, adhesion force between the optical film and a functional coating layer is excellent, and a rainbow phenomenon is reduced and an optical property is excellent due to a small refractive index difference.

11 Claims, No Drawings

(56) References Cited

U.S. PATENT DOCUMENTS

| | | |
|---|---|---|
| 2013/0100530 A1 | 4/2013 | Weber et al. |
| 2013/0194211 A1 | 8/2013 | Shinohara et al. |
| 2013/0216807 A1 | 8/2013 | Wakefield et al. |

FOREIGN PATENT DOCUMENTS

| | | |
|---|---|---|
| CN | 102417807 A | 4/2012 |
| CN | 102981203 A | 3/2013 |
| CN | 103232578 A | 8/2013 |
| EP | 1661938 A1 | 5/2006 |
| EP | 2816085 A1 | 12/2014 |
| JP | 2005-097571 A | 4/2005 |
| JP | 2008-212837 A | 9/2008 |
| JP | 2009-025575 A | 2/2009 |
| JP | 2011-067953 A | 4/2011 |
| JP | 2012-126810 A | 7/2012 |
| JP | 2015-163712 A | 9/2015 |
| KR | 2012-0060980 A | 6/2012 |
| KR | 2012-0071912 A | 7/2012 |
| KR | 2012-0106589 A | 9/2012 |
| KR | 10-2013-0035904 A | 4/2013 |
| KR | 2013-0095852 A | 8/2013 |
| KR | 2013-0102529 A | 9/2013 |
| WO | 2011/037033 A1 | 3/2011 |

* cited by examiner

OPTICAL FILM COMPRISING PRIMER LAYER CONTAINING POLYESTER RESIN AND POLARIZING PLATE USING SAME

This application is a National Stage Entry of International Application No. PCT/KR2014/009168, filed on Sep. 30, 2014, and claims the benefit of and priority to Korean Application No. 10-2013-0117049, filed on Sep. 30, 2013, and Korean Application No. 10-2014-0129389, filed on Sep. 26, 2014, all of which are incorporated herein by reference in their entirety for all purposes as if fully set forth herein.

TECHNICAL FIELD

The present invention relates to an optical film and a polarizing plate including the same, and more particularly, to an optical film including a primer layer including a polyester resin, in which a refractive index difference between a base material film and the primer layer is 0.03 or less, and a polarizing plate including the same.

BACKGROUND ART

A polarizing plate has been generally used as a structure where a protection film is laminated on one surface or both surfaces of a polarizer formed of a polyvinyl alcohol (hereinafter, referred to as 'PVA')-based resin dyed with a dichromatic dye or iodine by using an adhesive. In the related art, a triacetyl cellulose (TAC)-based film has been mainly used as the protection film for the polarizing plate, but there is a problem in that the TAC film is easily deformed under high temperature and high humidity environment. Accordingly, recently, protection films of various materials which can replace the TAC film have been developed, and for example, a method where polyethylene terephthalate (PET), cycloolefin polymer (COP), and acryl-based films, and the like are used alone or are used while being mixed is proposed.

Meanwhile, the protection film for the polarizer may include various functional coating layers such as an antireflection layer and a hard coating layer on an opposite surface of a surface to which the polarizer is attached for the purpose of reflection prevention, durability improvement, scratch prevention, visibility improvement, and the like. The functional coating layers are generally formed by a method of applying a coating composition including a base resin, a solvent, an additive, and the like on the protection film, and then performing curing. However, there is a case where adhesion force with the functional coating layer is not sufficient according to a kind of protection film, and in this case, there is a problem in that the functional coating layer is stripped from the protection film or damaged to reduce performance of the polarizing plate.

In order to solve the aforementioned problem, a method of performing surface treatment such as plasma treatment and corona treatment on a surface of the protection film or forming a primer layer, and the like have been proposed, but by the method proposed until now, adhesion force between the protection film, particularly an acryl-based protection film, and the functional coating layer cannot be sufficiently ensured. For example, in the case of a urethane-based resin proposed as a primer layer for a protection film in the related art, there are problems in that since water resistance and solvent resistance are low, adhesion force is reduced due to permeation of moisture during storage over a long period of time under high humidity, or in the case where the coating composition including the organic solvent is applied on the primer layer, the primer layer is dissolved due to the organic solvent included in the coating composition to be detached from the film.

Moreover, in the case of the functional coating layer for reflection prevention and scratch prevention, diffused reflection occurs by using silicas having different sizes to reduce reflectance and thus provide an antireflection function, or reflectance is reduced to 1% s by using a layer having a low refractive index to provide the antireflection function. Likewise, there is a problem in that in the case where silicas having different sizes are used or the layer having the low refractive index is used, the coating layer is transparent, and thus in the case where the refractive index difference between the primer layer and the acryl film is large, a rainbow phenomenon due to interference of light occurs.

Accordingly, in order to solve the aforementioned problems, an optical film having excellent adhesion force and optical property through a primer layer having excellent water resistance and solvent resistance, and a polarizing plate need to be developed.

DISCLOSURE

Technical Problem

The present invention has been made in an effort to provide an optical film including a primer layer containing a polyester resin having excellent water resistance, solvent resistance, and adhesion force on at least one surface of a base material film, and having a refractive index difference of 0.03 or less between the primer layer and the base material film, and a polarizing plate.

Technical Solution

An exemplary embodiment of the present invention provides an optical film including: a base material film; and a primer layer containing a polyester resin and water-dispersible minute particulates on at least one surface of the base material film and having a refractive index difference of 0.03 or less from the base material film, in which the polyester resin includes polyester glycol formed by a reaction of polybasic acid including an aromatic carboxylic acid compound and an aliphatic carboxylic acid compound at a mole ratio of 1:9 to 9:1 and polyol.

Meanwhile, the polyester resin may include a polyester acryl resin formed by further copolymerizing an acryl-based monomer with polyester glycol formed by the reaction of the polybasic acid and polyol, and in this case, it is preferable that polyester glycol and the acryl-based monomer be copolymerized at a weight ratio of 2:8 to 7:3.

Meanwhile, the primer layer may further include an acryl-based compound.

Meanwhile, it is preferable that a refractive index of the base material film be 1.45 to 1.65, and the base material film may be an acryl-based film.

Another exemplary embodiment of the present invention provides a polarizing plate including: a polarizer; and the optical film according to the present invention on at least one surface of the polarizer.

Yet another exemplary embodiment of the present invention provides an image display device including: the polarizing plate according to the present invention.

Advantageous Effects

In an optical film of the present invention, by using a primer layer containing a polyester resin and water-dispersible minute particulates, it is possible to implement sufficient adhesion force between the optical film and a functional coating layer and maintain stable adhesion force over a long period of time without an additive such as a cross-linking agent.

Moreover, by adjusting a content ratio of elements constituting the polyester resin, it is easy to adjust the refractive index difference between the base material film and the primer layer to 0.03 or less, and thus it is possible to reduce a rainbow phenomenon and provide an optical film and a polarizing plate having excellent optical properties.

MODE FOR INVENTION

Hereinafter, preferred exemplary embodiments of the present invention will be described. However, the exemplary embodiments of the present invention may be modified into various other forms and the scope of the present invention is not limited to exemplary embodiments as will be described below. The exemplary embodiments of the present invention are provided so that those skilled in the art may more completely understand the present invention.

The present inventors have repeatedly studied to develop an optical film having excellent adhesion force with a functional coating layer and excellent optical performance, resulting in development of the optical film of the present invention, which includes a primer layer including a polyester resin and water-dispersible minute particulates on at least one surface of a base material film and has a refractive index difference of 0.03 or less between the base material film and the primer layer.

Since the optical film according to the present invention includes the polyester resin having excellent solvent resistance and water resistance as a main component of the primer layer, damage to the base material film by an organic solvent included in a functional coating layer composition can be minimized, and close contact force between the functional coating layer and the base material film can be improved to effectively prevent the functional coating layer from being stripped.

Further, since the refractive index difference between the base material film and the primer layer is small, occurrence of optical defects such as a rainbow phenomenon caused by a reflectance difference between the base material film and the primer layer can be minimized.

Meanwhile, the rainbow phenomenon refers to stains by interference of light caused by reflection of light, and occurs because in the case where the refractive index difference between the base material film and the primer layer is large, the reflectance difference between light wavelengths caused by overlapping of light reflected on a surface of the base material film and light reflected on a surface of the primer layer is large. The rainbow phenomenon weakens visibility and causes fatigue of eyes. Accordingly, in the case where a difference between the refractive index of the primer layer and the refractive index of the base material film is 0.03 or less, since the reflectance difference between the wavelengths is not large, the rainbow phenomenon may be suppressed.

To be more specific, the optical film of the present invention includes a base material film; and a primer layer containing a polyester resin and water-dispersible minutes particulate on at least one surface of the base material film and having a refractive index difference of 0.03 or less from the base material film, and the polyester resin includes polyester glycol formed by a reaction of polybasic acid including an aromatic carboxylic acid compound and an aliphatic carboxylic acid compound at a mole ratio of 1:9 to 9:1 and polyol.

To be more specific, in the present invention, the polyester resin means a resin including an ester group formed by a reaction of carboxylic acid and alcohol on a main chain, may be preferably a water-dispersible polyester resin, and includes polyester glycol formed by the reaction of the polybasic acid and polyol.

In this case, polybasic acid components are the aromatic carboxylic acid compound and the aliphatic carboxylic acid compound, and the aromatic carboxylic acid compound and the aliphatic carboxylic acid compound may include the aromatic carboxylic acid and the aliphatic carboxylic acid, and moreover, reactive derivatives such as acid anhydride, alkyl ester, and acid halide thereof. The examples may be used alone or in combination of two kinds or more. Among the examples, terephthalic acid, isophthalic acid, succinic acid, and the like are particularly preferable. Further, in the case where the isophthalic acid substituted by sulfonate is used as basic acid, it is particularly preferable in terms of water dispersibility.

To be more specific, examples of the aromatic carboxylic acid compound may include ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid, but are not limited thereto.

Further, examples of the aliphatic carboxylic acid compound may include chain aliphatic carboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; and cyclic aliphatic carboxylic acid such as hexahydrophthalic acid, tetrahydrophthalic acid, 1,3-cyclohexanedicarboxylic acid, and 1,4-cyclohexanedicarboxylic acid, but are not limited thereto.

Meanwhile, polyol is not particularly limited as long as polyol has two or more hydroxyl groups in a molecule thereof, and predetermined appropriate polyol may be adopted. For example, it is preferable that polyol be at least one kind selected from the group consisting of ethyleneglycol, 1,2-propanonediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerytriol, glucose, sucrose, and sorbitol. Further, in the case where dimethylolalkanoic acid, dimethylolacetic acid, dimethylolpropionic acid, and dimethylolbutanoic acid containing a carboxy group are used alone or in combination of two kinds or more as polyol, it is particularly preferable in terms of water dispersibility.

Meanwhile, it is preferable that polyester glycol be formed by reacting the polybasic acid and polyol at the mole ratio of 2.5:1 to 1:2.5, preferably 2.3:1 to 1:2.3, and more preferably 2:1 to 1:2. This is because in the case where the reaction mole ratio of the polybasic acid and polyol deviates from the aforementioned numerical range, an odor may be generated or coating defects may be caused by unreacted monomers.

Meanwhile, the present invention is characterized by the optical film having the refractive index difference of 0.03 or less between the base material film and the primer layer, and the refractive index difference has a value of 0.03 or less by adjusting a composition ratio of the polybasic acid.

As described above, the polyester resin includes polyester glycol formed by the reaction of the polybasic acid and polyol, the polybasic acid includes the aromatic carboxylic acid compound and the aliphatic carboxylic acid compound, and in this case, it is preferable that the polybasic acid include the aromatic carboxylic acid compound and the aliphatic carboxylic acid compound at the mole ratio of about 1:9 to 9:1. More preferably, the aromatic carboxylic acid compound and the aliphatic carboxylic acid compound are included at the mole ratio of about 2:8 to 8:2. In the case where the aforementioned numerical range is satisfied, the refractive index difference between the base material film and the primer layer can be adjusted to be 0.03 or less, and a surface thereof is not tacky but may be uniformly formed.

To be more specific, in the case where the content of the aromatic carboxylic acid compound is smaller than the content of the aliphatic carboxylic acid compound, the refractive index of the primer layer is reduced, and in the case where the content of the aromatic carboxylic acid compound is larger than the content of the aliphatic carboxylic acid compound, the refractive index of the primer layer is increased. That is, the refractive index can be adjusted to approach the refractive index of the base material film as will be described below.

A refractive index n, as represented by the following Equation 1, is a ratio of a speed Cm of light passing through a medium to a speed Cv of light in the vacuum, and in the case where light passes through a medium having a high electron density, since the speed of light becomes slow by interaction with electrons, the refractive index is increased. Specifically, since an aromatic cycle has a structure where π electrons are shared at a 2p orbital, the electron density is high by the structure where the electrons float over a flat aromatic cycle, and thus the aromatic cycle easily interacts with radiated light as compared to aliphatics. Accordingly, as described above, if light passes through the medium having many aromatic cycles, the speed is reduced to increase the refractive index.

$$N=Cv/Cm \quad \text{[Equation 1]}$$

Meanwhile, the polyester resin may become, if necessary, a polyester acryl resin including an acryl-based unit together with an ester unit by further copolymerizing an acryl-based monomer component. In this case, a polyester unit may serve to increase an close contact property of the base material, and the acryl-based unit may further improve solvent resistance.

Examples of the acryl-based monomer usable in the present invention may include one kind or more selected from the group consisting of alkyl (meth)acrylate, alkyl acrylate, epoxy (meth)acrylate, hydroxyalkyl acrylate, alkyl (meth)acrylic acid including a carbonyl group, alkylacrylic acid, and acrylate including sulfonate. In this case, examples of acrylate including sulfonate may include acrylate including sodium 2-methyl-2-propene-1-sulfonate, acrylate including sodium aryl sulfonate, acrylate including 2-propene-1-sulfonate, and the like. Meanwhile, when among the acryl-based monomers, an epoxy acrylate monomer containing an epoxy group is copolymerized with the polyester resin, there is a merit in that an epoxy cycle is dissociated at high temperatures to generate an addition polymerization reaction between the epoxy cycles and thus perform cross-linking and improve high temperature durability of the polyester main chain, thereby increasing high temperature stability.

More preferably, in the polyester resin of the present invention, two kinds or more acryl-based monomers may be included, and most preferably, an epoxy (meth)acrylate monomer such as an alkyl (meth)acrylate monomer and a glycidyl (meth)acrylate may be further included.

In this case, as described above, in the case where the acryl-based monomer is further included in the polyester resin, that is, in the case where the polyester acryl resin is formed by further copolymerizing the acryl-based monomer with polyester glycol formed by the reaction of the polybasic acid and polyol, the weight ratio of polyester glycol and the acryl-based monomer may be about 2:8 to 7:3 and more preferably about 3:7 to 7:3. In the case where the weight ratio of polyester glycol and the acryl-based monomer satisfies the aforementioned numerical range, properties such as the close contact property of the primer layer with the base material and solvent resistance are excellent, and particularly, the refractive index difference between the base material film and the primer layer can be adjusted to be 0.03 or less. In the case where the weight ratio is 2:8 or less, a coating property of the primer layer may be reduced. To be more specific, the refractive index of the primer layer can be changed in proportion to the weight ratio of polyester glycol to the acryl-based monomer and thus be adjusted to approach the refractive index of the base material film as will be described below. As described above, since the aromatic cycle is included in polyester and the acryl resin is formed of aliphatics, if the content of polyester is reduced, the number of aromatic cycles that can interact with light is reduced, and thus the refractive index is reduced.

Meanwhile, a method of manufacturing the polyester resin may adopt a predetermined appropriate method known in the art. For example, the polyester resin may be manufactured by a method of performing polycondensation after an esterification reaction of the polybasic acid and polyol, a method of performing condensation polymerization after an esterification reaction of polybasic acid anhydride and polyol, or the like, and to be more specific, the aforementioned methods may include (1) a raw material mixing step of mixing polymerization raw materials for polyester polymerization to obtain a raw material mixture, (2) an esterification reaction step of esterifying the raw material mixture, and (3) a polycondensation step of performing polycondensation of the esterified raw material mixture to obtain polyester.

After the polyester resin is manufactured, a terminal of polyester is acrylated by reducing a temperature to 100° C. or less, and adding the acryl monomer reacted with the acid or the hydroxy functional group of polyester together with a catalyst. After acrylated polyester is dispersed in water while being agitated at a high speed, an initiator may be added and acryl polymerization may be performed by emulsion polymerization to manufacture the polyester acryl resin.

Meanwhile, the polyester resin manufactured through the aforementioned method and used in the present invention may include both repeating units represented by the following [Chemical Formula 1] and [Chemical Formula 2].

[Chemical Formula 1]

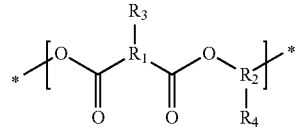

-continued

[Chemical Formula 2]

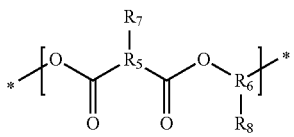

In [Chemical Formula 1] and [Chemical Formula 2], $R_1$ is substituted or unsubstituted C6-20 aryl, $R_5$ is substituted or unsubstituted C1-20 alkyl or C5-20 cycloalkyl, $R_2$ and $R_6$ are each independently hydrogen, substituted or unsubstituted C1-20 alkyl, substituted or unsubstituted C6-20 aryl, or substituted or unsubstituted C5-20 cycloalkyl, and $R_3$, $R_4$, $R_7$, and $R_8$ are each independently hydrogen, substituted or unsubstituted C1-20 alkyl, substituted or unsubstituted C6-20 aryl, substituted or unsubstituted $C_{5-20}$ cycloalkyl, a carboxy group, a hydroxy group, or a sulfonate group.

Further, the polyester resin may further include additional components in addition to the aforementioned components in the range not marring physical properties of the present invention.

Meanwhile, the primer layer containing the polyester resin and the water-dispersible minute particulates, more specifically, may be formed by a primer composition including 100 parts by weight of the polyester resin; 1 to 20 parts by weight of the water-dispersible minute particulates; and residual water. In this case, the term 'residual' means a content of the others other than solids in the primer composition.

To be more specific, the water-dispersible minute particulates include 1 to 20 parts by weight of the water-dispersible minute particulates based on 100 parts by weight of the polyester resin. In the case where the content of the water-dispersible minute particulates satisfies the aforementioned range, it is preferable in terms of a work operating property, a winding property, a slip property, transparency, and the like.

As the water-dispersible minute particulates usable in the present invention, any appropriate minute particulates may be used, and for example, inorganic minute particulates, organic minute particulates, or a combination thereof may be used. Examples of the inorganic minute particulates may include inorganic oxides such as silica, titania, alumina, zirconia, and antimonys, and the like. Examples of the organic minute particulates may include a silicon-based resin, a fluorine-based resin, a (meth)acryl-based resin, cross-linked polyvinyl alcohol, a melamine-based resin, and the like.

Among the water-dispersible minute particulates, silica is particularly preferable. The reason is that since silica has a better blocking suppression ability and excellent transparency, silica does not cause a haze and coloring, and thus an effect on the optical property of the polarizing plate is smaller. Further, since colloidal silica has good dispersibility and dispersion stability with respect to the primer composition, when the primer is formed, workability is better.

Meanwhile, an average diameter (average primary particulate diameter) of the water-dispersible minute particulates may be about 10 to 200 nm and more preferably about 20 to 70 nm. When the average diameter of the water-dispersible minute particulates is less than 10 nm, since surface energy is increased, agglomeration and precipitation of the water-dispersible particulates may occur in the primer composition to hinder stability of the solution, and in the case where the average diameter is more than 200 nm, the water-dispersible particulates are not uniformly dispersed in the primer composition but agglomerate, such that a wavelength becomes larger than a wavelength of visible rays (400 nm-800 nm), thus scattering light of 400 nm or more to increase a haze. By using the minute particulates having the particulate diameter in the aforementioned range, unevenness is appropriately formed on the surface of the primer layer, and particularly, frictional force on a contact surface between the acryl-based film and the primer layer and/or between the primer layers may be effectively reduced. As a result, a blocking suppression ability may be better.

Since the primer composition of the present invention is an aqueous system, preferably, the minute particulates are mixed as water-dispersible substances. Specifically, in the case where silica is adopted as the minute particulates, preferably, the minute particulates are mixed in the form of colloidal silica. Products sold in the market in the art may be used as it is as colloidal silica, and for example, Snowtex series manufactured by Nissan Chemical Industries, Ltd., AEROSIL series manufactured by Air Products & Chemicals, Inc., epostar series and soliostar RA series manufactured by Nippon Catalyst PTE Ltd., LSH series manufactured by Ranco, Co., Ltd., and the like may be used.

Meanwhile, the primer layer of the present invention may further include an acryl-based compound. In this case, it is preferable that when the primer layer is manufactured, the acryl-based compound be included by a method of blending the acryl-based compound with the polyester resin.

The acryl-based compound may be an acryl-based monomer or an acryl-based resin. In this case, the acryl-based monomer, for example, may be one kind or more selected from the group consisting of alkyl (meth)acrylate, alkyl acrylate, epoxy (meth)acrylate, hydroxyalkyl acrylate, alkyl (meth)acrylic acid including a carbonyl group, alkylacrylic acid, and acrylate including sulfonate but is not limited thereto, and the acryl-based monomer used in the copolymer of polyester and acryl may be used.

Meanwhile, the acryl-based resin may be an acryl-based oligomer or a polymer resin manufactured from the acryl-based monomer.

Meanwhile, the added acryl-based compound is included in the content of preferably 10 to 90 parts by weight and more preferably 30 to 70 parts by weight based on 100 parts by weight of the polyester resin. In the case where the content of the acryl-based compound satisfies the aforementioned numerical range with respect to the polyester resin, since the refractive index difference from the base material film may be adjusted to a desired range, occurrence of the rainbow may be reduced. Particularly, the refractive index difference between the base material film and the primer layer can be adjusted to 0.03 or less.

Next, the base material film of the present invention will be described.

The base material film may be a single layer or a structure where two or more films are laminated, and in the case of the structure where the two or more films are laminated, the laminated films may be formed of materials that are the same as or different from each other.

In the optical film of the present invention, it is preferable to use the base material film having a refractive index of 1.45 to 1.65. To be more specific, in the case of the acryl-based film, the refractive index is about 1.45 to 1.55, and in the case of an ester-based film, the refractive index is about 1.55 to 1.65.

It is an object of the present invention to, adjust the refractive index of the primer layer so that the refractive index difference between the base material film and the primer layer is 0.03 or less, in order to suppress the rainbow phenomenon and as described above, the refractive index of the primer layer may be adjusted so that the refractive index difference with the base material film is 0.03 or less by adjusting the contents of the aromatic carboxylic acid and the aliphatic carboxylic acid constituting the polybasic acid, or additionally adjusting the weight ratio of polyester glycol and the acryl-based monomer constituting the polyester acryl resin. That is, in the case where the base material film is the acryl-based film (about 1.5), the refractive index of the primer layer may be adjusted to about 1.47 to 1.53, and in the case where the base material film is the ester-based film (about 1.6), the refractive index of the primer layer may be adjusted to about 1.57 to 1.63.

The base material film is preferably the acryl-based film or the ester-based film and particularly most preferably the acryl-based film. Herein, the acryl-based film means a film including a resin including an acrylate-based unit and/or a methacrylate-based unit as a main component, and is a concept including a film including a homopolymer resin formed of the acrylate-based unit or the methacrylate-based unit and a copolymer resin where other monomer units are copolymerized in addition to the acrylate-based unit and/or the methacrylate-based unit as main components, and a film formed by a blend resin where the aforementioned acryl resin is blended with other resins.

Examples of the monomer unit that can be copolymerized with the acryl-based resin may include an aromatic vinyl-based unit, a 3 to 6-membered hetero cycle unit substituted by a carbonyl group, an acrylic acid unit, a glycidyl unit, and the like. In this case, the aromatic vinyl-based unit refers to, for example, a unit derived from styrene, alpha-methyl styrene, and the like, and the 3 to 6-membered hetero cycle unit substituted by the carbonyl group refers to, for example, a unit derived from a lactone cycle, glutaric anhydride, glutarimide, maleimide, maleic anhydride, and the like.

For example, the acryl-based film may be a film including a copolymer including an alkyl(meth)acrylate-based unit and a 3 to 10-membered hetero cycle unit substituted by at least one carbonyl group. In this case, the 3 to 10-membered hetero cycle unit substituted by the carbonyl group may be a lactone cycle, glutaric anhydride, glutarimide, maleic anhydride, maleimide, or the like.

Another example of the acryl film may be a film including a blending resin where the acryl resin is blended with an aromatic resin having a carbonate portion in a main chain. In this case, the aromatic resin having the carbonate portion in the main chain may be, for example, a polycarbonate resin, a phenoxy resin, or the like.

A method of manufacturing the acryl-based resin film is not particularly limited, and for example, the acryl-based resin film may be manufactured by sufficiently mixing the acryl-based resin, other polymers, additives, and the like by any appropriate mixing method to manufacture a thermosetting resin composition and then molding the thermosetting resin composition into a film, or by preparing the acryl-based resin, other polymers, additives, and the like in separate solutions, mixing the solutions to form a uniform mixture solution, and molding the mixture solution into a film.

The thermosetting resin composition is, for example, manufactured by performing extrusion kneading of a mixture obtained after pre-blending film raw materials by any appropriate mixer such as an omni mixer. In this case, the mixer used in extrusion kneading is not particularly limited, and for example, an extruder such as a single-screw extruder and a twin-screw extruder, or any appropriate mixer such as a pressure kneader may be used.

Examples of a method of molding the film may include any appropriate film molding method such as a solution cast method (solution cast method), a melt extrusion method, a calendering method, and an extrusion molding method. Among the film molding methods, the solution cast method (solution cast method) and the melt extrusion method are preferable.

Examples of a solvent used in the solution cast method (solution cast method) may include aromatic hydrocarbons such as benzene, toluene, and xylene; aliphatic hydrocarbons such as cyclohexane and decaline; esters such as ethyl acetate and butyl acetate; ketones such as acetone, methylethylketone, and methylisobutylketone; alcohols such as methanol, ethanol, isopropanol, butanol, isobutanol, methylcellosolve, ethylcellosolve, and butylcellosolve; ethers such as tetrahydrofuran and dioxane; halogenated hydrocarbons such as dichloromethane, chloroform, and carbon tetrachloride; dimethylformamide; dimethyl sulfoxide, and the like. The solvents may be used alone or in combination of two kinds or more thereof.

Examples of a device for performing the solution cast method (solution cast method) may include a drum-type casting machine, a band-type casting machine, a spin coater, and the like. Examples of the melt extrusion method may include a T-die method, an inflation method, and the like. A molding temperature is preferably 150 to 350° C. and more preferably 200 to 300° C.

In the case where the film is molded by the T-die method, a T die may be installed at a front end of the publicly known single-screw extruder or twin-screw extruder and the film extruded in a film form may be wound to obtain a film having a roll shape. In this case, a temperature of the wound roll may be appropriately adjusted to perform stretching in an extrusion direction and thus perform uniaxial stretching. Further, the film may be stretched in a direction that is vertical to the extrusion direction to perform simultaneous biaxial stretching, successive biaxial stretching, and the like.

The acryl-based film may be any one of a non-stretched film or a stretched film. In the case of the stretched film, the acryl-based film may be a uniaxially stretched film or a biaxially stretched film, and in the case of the biaxially stretched film, the acryl-based film may be any one of a simultaneously biaxially stretched film or a successively biaxially stretched film. In the case of the biaxial stretching, mechanical strength is improved to improve performance of the film. By mixing the acryl-based film with the other thermosetting resin, even in the case of stretching, an increase in phase difference may be suppressed, and optical isotropicity may be maintained.

A stretching temperature is preferably in a range around a glass transition temperature of a thermosetting resin composition that is a raw material of the film, and in the range of preferably (glass transition temperature of −30° C.) to (glass transition temperature of +100° C.) and more preferably (glass transition temperature of −20° C.) to (glass transition temperature of +80° C.). If the stretching temperature is less than (glass transition temperature of −30° C.), a sufficient stretching magnification may not be obtained. On the contrary, if the stretching temperature is more than (glass transition temperature of +100° C.), fluidization (flow) of the resin composition occurs, and thus stable stretching may not be performed.

The stretching magnification defined by an area ratio is preferably 1.1 to 25 times and more preferably 1.3 to 10 times. If the stretching magnification is less than 1.1 times, stretching may not lead to improvement of toughness. If the stretching magnification is more than 25 times, an effect to such a degree of increase in stretching magnification may not be admitted.

A stretching speed in one direction is preferably 10 to 20,000%/min and more preferably 100 to 10,000%/min. In the case where the stretching speed is less than 10%/min, a slightly long time is required to obtain the sufficient stretching magnification, and thus manufacturing cost may be increased. If the stretching speed is more than 20,000%/min, breakage of the stretched film and the like may occur.

The acryl-based film may be subjected to heat treatment (annealing) and the like after stretching treatment in order to stabilize optical isotropicity or mechanical property thereof. A heat treatment condition is not particularly limited, and any appropriate condition known in the art may be adopted.

Meanwhile, the ester-based film is a film formed of polyester, and preferably has excellent transparency, mechanical strength, and optical isotropicity. Further, the ester-based film is preferable because the ester-based film can be manufactured by the melt extrusion method that is a film formation method which may be performed at low cost rather than a film formation method by the casting method like the triacetylcellulose film.

As polyester of the ester-based film, for example, publicly known polyester that can be molded into a film, such as polyethylene terephthalate, polyethylene naphthalate, polyester of an ethylene glycol-terephthalic acid-isophthalic acid copolymer, polyester of an ethylene glycol-hexamethylenedimethanol-terephthalic acid copolymer, a polyester-based thermosetting elastomer, and polyarylate may be used, and among the examples, polyethylene terephthalate is preferable. Further, as the ester-based film, the stretched film such as the uniaxially stretched or biaxially stretched film is advantageous rather than the non-stretched film in terms of transparency and mechanical strength. Particularly, in the case of the stretched film, the stretched film having low optical anisotropicity, that is, high optical isotropicity, is preferable because the stretched film does not disturb polarization, and the biaxially stretched film is preferable as compared to the uniaxially stretched film in view of the aforementioned aspect.

Further, the ester-based film may be used as a single layer or a laminate of two or more layers by homogeneous or heterogeneous polyester in addition to a film of a single layer by homogeneous polyester, and if necessary, a publicly known additive such as appropriate ultraviolet ray absorbent and antistatic agent may be appropriately added to the ester-based film.

Meanwhile, the optical film of the present invention may be manufactured by applying the primer composition of the present invention on at least one surface of the base material film to form the primer layer. In this case, the application may be performed by a method of applying the primer composition on the base material film by using a method well known in the art, for example, a bar coating method, a gravure coating method, a slot die coating method, and the like, and performing drying. In this case, the drying may be performed through a convection oven and the like, but is not limited thereto, and preferably, is performed at a temperature of 100° C. to 120° C. for 1 minute to 5 minutes. A drying temperature depends on a coating step, and in the case of the stretching completion film, drying may be performed in a range which does not exceed a glass transition temperature (Tg) of the film, and in the case where stretching is included, drying is performed at the stretching temperature together with stretching and is performed in a range which does not exceed a decomposition temperature (Td) of the film.

Meanwhile, a thickness of the primer layer formed by the aforementioned method is preferably 50 nm to 2000 nm, more preferably 100 nm to 1500 nm, and even more preferably 300 nm to 1000 nm. There is a problem in that in the case where the thickness of the primer layer is less than 50 nm, adhesion force is not sufficient, and there is a problem in that in the case where the thickness is more than 2000 nm, drying is not sufficiently performed or the water-dispersible minute particulates are buried in the primer layer, and thus a slip property cannot be well provided.

Moreover, if necessary, at least one surface of the optical film may be subjected to surface treatment in order to improve adhesion force, and in this case, a surface treatment method may be at least one selected from the group consisting of alkali treatment, corona treatment, and plasma treatment. Particularly, in the case of the acryl-based film where the optical film used in the present invention does not include the lactone cycle, it is preferable to perform the aforementioned surface treatment.

Meanwhile, as described above, after the primer layer is formed on at least one surface of the base material film, a functional coating layer such as a hard coating layer and an antireflection layer may be laminated on an upper portion of the primer layer.

In this case, the functional coating layer may be formed using various compositions according to a function to be provided, and for example, the functional coating layer may be formed by a composition for forming the functional coating layer, which includes a binder resin, minute particulates, a solvent, and the like.

For example, in the present invention, in the composition for forming the functional coating layer, as the binder resin, a binder resin well known in the art, such as an acryl-based binder resin, a urethane-based binder resin, or a mixture thereof, may be used.

The kind of acryl-based binder resin is not particularly limited, and the acryl-based binder resin can be selected to be used without a particular limitation as long as the acryl-based binder resin is known in the art. As examples of the acryl-based binder resin, an acrylate monomer, an acrylate oligomer, a mixture thereof, or the like may be used. In this case, it is preferable that the acrylate monomer or the acrylate oligomer include at least one acrylate functional group that can participate in a curing reaction.

The kind of acrylate monomer and acrylate oligomer is not particularly limited, and the acrylate monomer and the acrylate oligomer that are generally used in the art to which the present invention pertains can be selected to be used without a limitation.

Further, as the acrylate oligomer, a urethane acrylate oligomer, an epoxy acrylate oligomer, polyester acrylate, polyether acrylate, a mixture thereof, or the like may be used. As the acrylate monomer, dipentaerythritol hexaacrylate, dipentaerythritol pentaacrylate, dipentaerythritol hydroxy pentaacrylate, pentaerythritol tetraacrylate, pentaerythritol triacrylate, trimethylene propyl triacrylate, propoxylated glycerol triacrylate, trimethylopropane ethoxy triacrylate, 1,6-hexanedioldiacrylate, propoxylated glycero triacrylate, tripropylene glycol diacrylate, ethyleneglycol diacrylate, a mixture thereof, or the like may be preferably used, but the acrylate monomer is not limited thereto.

Meanwhile, as the minute particulates, organic minute particulates, inorganic minute particulates, or a mixture thereof may be used, and the content of the minute particulates may be about 0.1 to 10 parts by weight based on 100 parts by weight of the binder resin, but is not limited thereto. There are merits in that in the case where the content of the minute particulates satisfies the aforementioned numerical range, a haze value is sufficiently implemented and a coating property becomes good.

Meanwhile, in the case where a mixture of the organic minute particulates and the inorganic minute particulates is used as the minute particulates, it is preferable that the content of the inorganic minute particulates be in the range of 20 parts by weight to 80 parts by weight based on 100 parts by weight of the organic minute particulates. There are merits in that in the case where the amount of the inorganic minute particulates satisfies the aforementioned numerical range, a scratch resistance property is excellent and a coating surface is good.

Further, as the inorganic minute particulates, a single substance or two or more selected from silica, silicon particulates, aluminum hydroxide, magnesium hydroxide, alumina, zirconia, and titania may be used, but the inorganic minute particulates are not limited thereto.

As the organic minute particulates, one or more or copolymers of two or more selected from polystyrene, polymethylmethacrylate, polymethylacrylate, polyacrylate, polyacrylate-co-styrene, poly-methylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, an epoxy resin, a phenol resin, a silicon resin, a melamine resin, benzoguamine, polydivinylbenzene, polydivinylbenzene-co-styrene, polydivinylbenzene-co-acrylate, polydiallylphthalate, and a triallylisocyanurate polymer may be used.

Meanwhile, the solvent may be included in the content of about 50 parts by weight to 500 parts by weight based on 100 parts by weight of the binder resin, but the content is not limited thereto. In the case where the content of the solvent satisfies the aforementioned numerical range, a coating property of the functional coating layer is excellent, film strength of the coating film is excellent, and it is easy to manufacture the functional coating layer in a thick film form.

The kind of solvent usable in the present invention is not particularly limited, and an organic solvent may be generally used. For example, one kind or more selected from the group consisting of $C_1$ to $C_6$ lower alcohols, acetates, ketones, cellosolves, dimethylformamide, tetrahydrofurane, propyleneglycolmonomethylether, toluene, and xylene may be used.

Herein, lower alcohols may be a single substance selected from methanol, ethanol, isopropyl alcohol, butyl alcohol, isobutyl alcohol, and diacetone alcohol, the acetates may be a single substance selected from methyl acetate, ethyl acetate, isopropyl acetate, butyl acetate, and cellosolve acetate, and the ketones may be a single substance selected from methylethylketone, methylisobutylketone, acetylacetone, and acetone, but the lower alcohols, acetates, and ketones are not limited thereto.

Meanwhile, the composition for forming the functional coating layer according to the present invention may further include, if necessary, a UV curing initiator added for the purpose of curing using UV radiation. The UV curing initiator may be a single substance or a mixture of two or more selected from 1-hydroxy cyclohexylphenyl ketone, benzyl dimethyl ketal, hydroxydimethylacetophenone, benzoin, benzoin methyl ether, benzoin ethyl ether, benzoin isopropyl ether, and benzoin butyl ether, but is not limited thereto.

It is preferable that the UV curing initiator be added in the content of 0.1 parts by weight to 10 parts by weight based on 100 parts by weight of the binder resin. In the case where the content of the UV curing initiator satisfies the aforementioned numerical range, sufficient curing may occur and film strength of the film may be improved.

Further, the composition for forming the functional coating layer according to the present invention may further include, if necessary, one kind or more additives selected from a leveling agent, a wetting agent, and an antifoaming agent. The additive may be added in the content of 0.01 parts by weight to 10 parts by weight based on 100 parts by weight of the binder resin.

In the present invention, the thickness of the functional coating layer may be about 1 μm to 20 μm and preferably about 1 μm to 4 μm, but is not limited thereto. In the case where the thickness of the functional coating layer satisfies the aforementioned numerical range, occurrence of cracks and the like may be prevented while sufficient functionality is implemented.

Meanwhile, the functional coating layer may be formed by a method of applying the composition for forming the functional coating layer on the primer layer, and then performing drying and/or curing, and in this case, the application may be performed through coating methods well known in the art, for example, wet coating such as a roll coating method, a bar coating method, a spray coating method, a dip coating method, and a spin coating method. However, the aforementioned coating method is not limited thereto, and of course, various other coating methods used in the art may be used.

Meanwhile, drying and/or curing may be performed by a method of radiating heat and/or light on the composition for forming the functional coating layer applied on the primer layer, and a drying step and a curing step may be sequentially performed or may be simultaneously performed. However, in consideration of process convenience and the like, it is more preferable that the curing step be performed through a method of radiating light such as UV.

Meanwhile, the curing condition may be appropriately adjusted according to a mixing ratio or a component of the composition for forming the functional coating layer, and for example, in the case of electron beam or ultraviolet ray curing, radiation may be performed at the intensity of radiation of 200 mJ/cm$^2$ to 1,000 mJ/cm$^2$ for about 1 second to 10 minutes. In electron beam or ultraviolet ray curing, in the case where a curing time satisfies the aforementioned numerical range, since the binder resin may be sufficiently cured, mechanical properties such as wear resistance are excellent, and durability of the transparent base material layer may be improved.

The optical film of the present invention may be disposed on at least one surface of the polarizer to be usefully used as the polarizer protection film. That is, the polarizing plate of the present invention may be constituted to include the polarizer; and the optical film of the present invention disposed on at least one surface of the polarizer.

To be more specific, the polarizing plate of the present invention may be constituted by the polarizer, the protection film disposed on at least one surface of the polarizer, and an adhesive layer interposed between the polarizer and the protection film, and in this case, the protection film may be the optical film of the present invention including the base material film, and the primer layer containing the polyester resin and the water-dispersible minute particulates on at least one surface of the base material film. In this case, a specific content relating to the primer layer and the optical film is the same as the aforementioned content.

Moreover, the polarizing plate according to the present invention that is manufactured as described above may be used for various purposes. Specifically, the polarizing plate may be preferably used in an image display device including a polarizing plate for a liquid crystal display (LCD), an antireflection polarizing plate of an organic EL display, and the like. Further, the polarizing plate according to the present invention may be applied to various kinds of functional films, for example, a complex polarizing plate obtained by combining various optical layers such as a phase difference plate such as a λ/4 plate and a λ/2 plate, an optical diffusion plate, a viewing angle expansion plate, a luminance improving plate, and a reflection plate.

Moreover, the optical film or the polarizing plate of the present invention may be usefully applied to various image display devices such as a liquid crystal display element.

Hereinafter, the present invention will be described in more detail through the Examples. The following Examples are set forth to illustrate the present invention, but are not to be construed to limit the present invention.

PREPARATION EXAMPLE 1

Preparation of Composition for Forming Functional Coating Layer 18 g of pentaerythritol triacrylate and 18 g of dipentaerythritol pentaacrylate as the binder resin; 250 g of the hollow silica particulate dispersion solution (manufactured by Catalyst and Chemicals Ltd., solution where hollow silica particulates having the number average particulate size of 50 to 60 nm were dispersed in the solid content of 20 wt % in the methylisobutylketone (MIBK) solvent) as the organic minute particulates; 10 g of the polyethersiloxane-based polymer (manufactured by EVONIK Ind., trade name: TEGO Glide 450) particulate; and 4 g of the photopolymerization initiator (manufactured by CIBA Specialty Chemicals Inc., trade name: Irgacure 184) were mixed and agitated for 30 minutes. Herein, methylisobutylketone (MIBK) was diluted so that the solid content was 3 wt % to prepare the low reflective coating layer composition.

PREPARATION EXAMPLE 2

Preparation of Polyester Resin (1) Synthetic Example of Polyester Resin A

The 500 ml round-bottom flask was substituted by nitrogen, and as will be described in the following [Table 1], ethylene glycol (EG), diethylene glycol (DEG), the sodiumsulfonyl isophthalic acid (SSIPA), the isophthalic acid (IPA), and the cyclohexanedicarboxylic acid (CHDA) were added at the mole ratio of 0.5:0.5:0.1:0.2:0.7, and esterified at 200° C. for 2 hours to discharge water in the theoretical amount. Tetramethyl titanate, antimony acetate, and dibutyltin oxide as the catalyst, and trimethyl phosphate as the stabilizer were added to continuously discharge water, and the condensation polymerization reaction was then performed at 255° C. under the reduced pressure of 2.5 torr or less for 150 minutes to prepare polyester resin A.

(2) Synthetic Example of Polyester Resin B

The 500 ml round-bottom flask was substituted by nitrogen, and as will be described in the following [Table 1], ethylene glycol (EG), diethylene glycol (DEG), the sodiumsulfonyl isophthalic acid (SSIPA), the isophthalic acid (IPA), and the adipic acid (AA) were added at the mole ratio of 0.5:0.5:0.1:0.4:0.5, and esterified at 200° C. for 2 hours to discharge water in the theoretical amount. Tetramethyl titanate, antimony acetate, and dibutyltin oxide as the catalyst, and trimethyl phosphate as the stabilizer were added to continuously discharge water, and the condensation polymerization reaction was then performed at 255° C. under the reduced pressure of 2.5 torr or less for 150 minutes to prepare polyester resin B.

(3) Synthetic Example of Polyester Acryl Resin C

The 500 ml round-bottom flask was substituted by nitrogen, and as will be described in the following [Table 1], ethylene glycol (EG), the sodiumsulfonyl isophthalic acid (SSIPA), the isophthalic acid (IPA), and the adipic acid (AA) were added at the mole ratio of 1:0.1:0.6:0.3, and esterified at 200° C. for 2 hours to discharge water in the theoretical amount. Tetramethyl titanate, antimony acetate, and dibutyltin oxide as the catalyst, and trimethyl phosphate as the stabilizer were added to continuously discharge water, and the condensation polymerization reaction was then performed at 255° C. under the reduced pressure of 2.5 torr or less for 150 minutes to prepare polyester resin B. Thereafter, glycidyl (meth)acrylate and methyl (meth)acrylate were added at the weight ratio of 2:1 and cooled, and agitated at the high speed in water, the reactants and the thermoinitiator were added, and the temperature was increased to 80° C. to prepare polyester acryl resin C for 2 hours. The weight ratio of polyester and acryl was 5:5.

(4) Synthetic Example of Polyester Acryl Resin D

The 500 ml round-bottom flask was substituted by nitrogen, and as will be described in the following [Table 1], ethylene glycol (EG), diethylene glycol (DEG), the sodiumsulfonyl isophthalic acid (SSIPA), the isophthalic acid (IPA), and the adipic acid (AA) were added at the mole ratio of 0.5:0.5:0.1:0.1:0.8, and esterified at 200° C. for 2 hours to discharge water in the theoretical amount. Tetramethyl titanate, antimony acetate, and dibutyltin oxide were added as the catalyst, and trimethyl phosphate was added as the stabilizer to continuously discharge water, and the condensation polymerization reaction was then performed under the reduced pressure of 2.5 torr or less for 50 minutes. Thereafter, glycidyl (meth)acrylate and methyl (meth)acrylate were added at the weight ratio of 2:1, and cooled, and agitated at the high speed in water, the reactants and the thermoinitiator were added, and the temperature was increased to 80° C. to prepare polyester acryl resin C for 2 hours. The weight ratio of polyester and acryl was 5:5.

(5) Polyester Acryl Resin E

The 500 ml round-bottom flask was substituted by nitrogen, and as will be described in the following [Table 1], ethylene glycol (EG), the sodiumsulfonyl isophthalic acid (SSIPA), the isophthalic acid (IPA), and the cyclohexanedicarboxylic acid (CHDA) were added at the mole ratio of 1:0.1:0.4:0.5, and esterified at 200° C. for 2 hours to discharge water in the theoretical amount. Tetramethyl titanate, antimony acetate, and dibutyltin oxide as the catalyst, and trimethyl phosphate as the stabilizer were added to continuously discharge water, and the condensation polymerization reaction was then performed at 255° C. under the reduced pressure of 2.5 torr or less for 150 minutes to prepare polyester resin B. Thereafter, glycidyl (meth)acrylate and methyl (meth)acrylate were added at the weight ratio of 2:1, cooled, and agitated at the high speed in water, the reactants and the thermoinitiator were added, and the temperature was increased to 80° C. to prepare polyester acryl resin E for 2 hours. The weight ratio of polyester and acryl was 6:4.

TABLE 1

| Classification | Resin | Composition (mole ratio) | | | | | | PES:Acryl (weight ratio) |
| --- | --- | --- | --- | --- | --- | --- | --- | --- |
| | | Polyol | | Polybasic acid | | | | |
| | | EG | DEG | ISSPA | IPA | CHDA | AA | |
| A Synthetic Example | Polyester | 0.5 | 0.5 | 0.1 | 0.2 | 0.7 | — | — |
| B Synthetic Example | Polyester | 1 | — | 0.1 | 0.4 | — | 0.5 | — |
| C Synthetic Example | Polyester acryl | 1 | — | 0.1 | 0.6 | — | 0.3 | 5:5 |
| D Synthetic Example | Polyester acryl | 0.5 | 0.5 | 0.1 | 0.1 | — | 0.8 | 5:5 |
| E Synthetic Example | Polyester acryl | 1 | — | 0.1 | 0.4 | 0.5 | — | 6:4 |

EXAMPLE 1

After 40 parts by weight of polyester resin A manufactured as described above, 3 parts by weight of silica, and 57 parts by weight of water were mixed to manufacture the primer composition, the primer composition was applied by the #7 bar on one surface of the acryl-based film subjected to corona treatment, and the film that was uniaxially stretched in the MD direction at 135° C. was then uniaxially stretched in the TD direction to manufacture the acryl-based film where the primer layer was formed in the thickness of 600 nm. The surface of the film was subjected to corona treatment under the condition of 50 W/m²/min.

The composition for forming the functional coating layer manufactured by Preparation Example 1 was applied by using bar coating on the surface of the manufactured film, on which the primer layer was applied, so that the thickness after drying was 4 μm, and UV of 280 mJ/cm² was then radiated to perform curing and thus obtain the film where the functional coating layer was formed.

EXAMPLE 2

The acryl-based film where the functional coating layer was formed was manufactured by the same method as Example 1, except that 40 parts by weight of polyester acryl resin B was used instead of 40 parts by weight of polyester resin A to manufacture the primer composition.

EXAMPLE 3

The acryl-based film where the functional coating layer was formed was manufactured by the same method as Example 1, except that 40 parts by weight of polyester acryl resin C was used instead of 40 parts by weight of polyester resin A to manufacture the primer composition.

EXAMPLE 4

The acryl-based film where the functional coating layer was formed was manufactured by the same method as Example 1, except that 40 parts by weight of polyester acryl resin D was used instead of 40 parts by weight of polyester resin A to manufacture the primer composition.

EXAMPLE 5

The acryl-based film where the functional coating layer was formed was manufactured by the same method as Example 1, except that 40 parts by weight of polyester acryl resin E was used instead of 40 parts by weight of polyester resin A to manufacture the primer composition.

EXAMPLE 6

The acryl-based film where the functional coating layer was formed was manufactured by the same method as Example 1, except that 8 parts by weight of polyester resin A (solid content 30%), 30.5 parts by weight of acryl resin MWX-002 (TAKAMAYSU Co., Ltd., solid content 31.5%), 3 parts by weight of silica, and 58.5 parts by weight of water were blended to manufacture the primer composition.

COMPARATIVE EXAMPLE 1

The acryl-based film where the functional coating layer was formed was manufactured by the same method as Example 1, except that 40 parts by weight of polyepoxy resin Modepics 502F (ARAKAWA Chemical Industries, Ltd.) was used instead of 40 parts by weight of polyester resin A to manufacture the primer composition.

COMPARATIVE EXAMPLE 2

The acryl-based film where the functional coating layer was formed was manufactured by the same method as Example 1, except that 80 parts by weight of polyester acryl resin HR0038 (Nippon Gohsei Co., Ltd., solid 15%, 100% of the aromatic carboxylic acid was contained as the polybasic acid) was used instead of 40 parts by weight of polyester resin A to manufacture the primer composition.

COMPARATIVE EXAMPLE 3

The acryl-based film where the functional coating layer was formed was manufactured by the same method as Example 1, except that 40 parts by weight of polyester acryl resin A-645GH (TAKAMATSU Co., Ltd., solid 30%, 100% of the aromatic carboxylic acid was contained as the polybasic acid) was used instead of 40 parts by weight of polyester resin A to manufacture the primer composition.

EXPERIMENTAL EXAMPLE 1

Measurement Method of Refractive Index Difference Between Base Material Film and Primer Layer After the primer layer was applied on the glass plate in the thickness of 4 μm, the refractive index was measured by using the prism coupler. In the case of the base material, the refractive index of the base material film was measured by changing the mode, and the difference thereof was calculated. In this case, the refractive index of the acryl-based film that was the base material film was 1.500. The measurement result is described in [Table 2].

EXPERIMENTAL EXAMPLE 2

Existence and Nonexistence of Rainbow Phenomenon

After the optical films according to the Examples and the Comparative Examples were manufactured, one surface thereof was subjected to hard coating treatment, and the other surface thereof was treated to exhibit the black color, and thus whether the rainbow was generated or not was confirmed by the naked eyes. During evaluation by the naked eyes, evaluation was performed in the dark room under the three wavelength lamp. The measurement result is described in [Table 2]. In this case, the evaluation standard is as follows.

Weak: The rainbow is not exhibited and uniform colors are exhibited.

Fair: The rainbow is slightly exhibited and uniform colors are exhibited.

Strong: The rainbow is strongly exhibited and strong colors are exhibited.

EXPERIMENTAL EXAMPLE 3

Measurement Method of Adhesion Force of Functional Coating Layer

Scars were formed by the knife at horizontal intervals of 1 mm and vertical intervals of 1 mm in the area of 10×10 in the functional coating layer, the tape was attached and then detached, and attachment was evaluated by the degree of detachment of the functional coating layer. In the case where the detachment area was 0 to 20% or less, the functional coating layer was evaluated to be OK, and if the detachment area was more than 20%, the functional coating layer was evaluated to be NG. The measurement result is described in the following [Table 2].

TABLE 2

| Classification | Primer refractive index | Refractive index difference | Rainbow | Adhesion force |
|---|---|---|---|---|
| Example 1 | 1.520 | 0.020 | Weak | OK |
| Example 2 | 1.525 | 0.025 | Weak | OK |
| Example 3 | 1.515 | 0.015 | Weak | OK |
| Example 4 | 1.511 | 0.111 | Weak | OK |
| Example 5 | 1.523 | 0.023 | Weak | OK |
| Example 6 | 1.520 | 0.020 | Weak | OK |
| Comparative Example 1 | 1.560 | 0.06 | Strong | NG |
| Comparative Example 2 | 1.627 | 0.127 | Strong | OK |
| Comparative Example 3 | 1.563 | 0.036 | Strong | OK |

Although the exemplary embodiments of the present application are described in detail, the scope of the present invention is not limited to the exemplary embodiments, and it will be apparent to those skilled in the art that various modifications and changes may be made thereto without departing from the spirit of the present invention described in the claims.

The invention claimed is:

1. An optical film comprising:
a base material film; and
a primer layer containing a polyester resin comprising a polyester acryl resin and water-dispersible minute particulates on at least one surface of the base material film and the primer layer having a refractive index difference of 0.015 or less from the base material film,
wherein the polyester acryl resin includes an acryl-based monomer, and a polyester glycol formed by a reaction of polyol and polybasic acid including an aromatic carboxylic acid compound and an aliphatic carboxylic acid compound at a mole ratio of 1:9 to 9:1, and
wherein the polyester acryl resin includes the polyester glycol and the acryl-based monomer at a weight ratio of 2:8 to 1:1.

2. The optical film of claim 1, wherein the mole ratio of the aromatic carboxylic acid compound and the aliphatic carboxylic acid compound is 2:8 to 8:2.

3. The optical film of claim 1, wherein the aromatic carboxylic acid compound is at least one kind selected from the group consisting of ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid.

4. The optical film of claim 1, wherein the aliphatic carboxylic acid compound is at least one kind selected from the group consisting of chain aliphatic carboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; and cyclic aliphatic carboxylic acid such as hexahydrophthalic acid, tetrahydrophthalic acid, 1,3-cyclohexanedicarboxylic acid, and 1,4-cyclohexanedicarboxylic acid.

5. The optical film of claim 1, wherein the primer layer further includes an acryl-based compound.

6. . The optical film of claim 1, wherein a refractive index of the base material film is 1.45 to 1.65.

7. The optical film of claim 1, wherein the base material film is an acryl-based film.

8. The optical film of claim 1, wherein a functional coating layer is laminated on the primer layer.

9. The optical film of claim 1, wherein the optical film is a protection film for a polarizing plate.

10. A polarizing plate comprising:
a polarizer; and
the optical film of claim 1 on at least one surface of the polarizer.

11. An image display device comprising:
the polarizing plate of claim 10.

* * * * *